United States Patent [19]
Oswald et al.

[11] 3,904,710
[45] Sept. 9, 1975

[54] PESTICIDAL O,S'-DIALKYL S-PHENYLTHIOALKYL DITHIOPHOSPHATES AND PREPARATION THEREOF

[75] Inventors: Alexis A. Oswald, Mountainside; Paul L. Valint, Jr., Woodbridge, both of N.J.

[73] Assignee: Exxon Research and Engineering Company, Linden, N.J.

[22] Filed: July 9, 1973

[21] Appl. No.: 377,872

Related U.S. Application Data

[60] Division of Ser. No. 173,267, Aug. 19, 1971, abandoned, which is a continuation of Ser. No. 821,117, May 1, 1969, abandoned.

[52] U.S. Cl. ............... 260/949; 260/940; 260/948; 260/956; 260/957; 260/978; 260/979; 260/985; 260/987; 424/210; 424/216
[51] Int. Cl.² .................. C07F 9/165; A01N 9/36

[58] Field of Search .................... 260/949

[56] References Cited
UNITED STATES PATENTS
3,078,295  2/1963  Schrader ................. 260/949 X
3,636,144  1/1972  Tsuchiya et al ............ 260/949 X FOREIGN PATENTS OR APPLICATIONS
38-16875  1963  Japan ................. 260/949

Primary Examiner—Anton H. Sutto
Attorney, Agent, or Firm—Frederick H. Rabin

[57] ABSTRACT

O,S'-dialkyl-S-hydrocarbylthioalkyl dithiophosphates can be prepared by the selective dealkylation-alkylation of the corresponding O,O'-dialkyl dithiophosphate esters. The $C_1$ to $C_2$ O-alkyl $C_3$ to $C_4$ S'-alkyl S-hydrocarbylthioalkyl dithiophosphate products show unexpectedly high effectiveness as pesticides.

5 Claims, No Drawings

PESTICIDAL O,S'-DIALKYL S-PHENYLTHIOALKYL DITHIOPHOSPHATES AND PREPARATION THEREOF

This is a division of application Ser. No. 173,267, filed on Aug. 19, 1971, now abandoned, which is a continuation of application Ser. No. 821,117 filed on May 1, 1969, now abandoned.

FIELD OF THE INVENTION

This invention relates to new O,S'-dialkyl S-hydrocarbylthioalkyl dithiophosphates, formulations or compositions thereof, and processes or methods of preparing and using the same. More particularly, this invention relates to the preparation of $C_1$ to $C_2$ O-alkyl $C_3$ to $C_4$ S-alkyl S'-hydrocarbylthioalkyl dithiophosphates by means of a selective two-step process comprising the dealkylation of the corresponding $C_1$ to $C_2$ O,O'-dialkyl hydrocarbylthioalkyl dithiophosphates followed by alkylation. The particular products have been found to be surprisingly superior pesticides to related known compounds.

PRIOR ART

O,O'-dialkyl S-hydrocarbylthioalkyl dithiophosphates represent a commercially important class of insecticides. Their synthesis and pesticidal action is described by Gerhard Schrader on pages 338–427 of his monograph, entitled "Die Entwicklung Neuer Insektizider Phosphorsaure-Ester," which was published by Verlag Chemie Gmbh., in Weinheim, W. Germany in 1963. Some of the isomeric O,S'-dialkyl S-hydrocarbyl thioalkyl dithiophosphates are also known in the prior art. For example, the synthesis of O,S'-diethyl S-2-ethylthioethyl dithiophosphate has been described by Gerhard Schrader in German Pat. Nos. 1,032,247 and 1,136,328. In these patents, O,S-diethyl thiophosphoric acid chloride and O,S-diethyl dithiophosphoric acid potassium salt were the respective phosphorus reactants for the syntheses. German Pat. No. 1,136,328 also describes the synthesis of an unsymmetrically substituted dialkyl ester of S-2-ethylthioethyl dithiophosphoric acid, i.e., of O-ethyl S'-methyl S-2-ethylthioethyl dithiophosphate. A comparison of the insecticidal activity of this unsymmetrical compound with those of the corresponding O,S'-dimethyl and O,S'-diethyl dithiophosphates in the above patent showed that both symmetrically substituted compounds had superior activity to the unsymmetrical compound. Higher O,S'-dialkyl hydrocarbylthioalkyl dithiophosphate esters were not known in the prior art. It was, however, generally assumed that higher dialkyl dithiophosphate esters are less effective, economically useless pesticides.

SUMMARY OF THE INVENTION

Organic dithiophosphates in general possess properties which make them suitable as pesticides, particularly as insecticides. The importance of selected members of such dithiophosphates, particularly of the O,O'-dialkyl dithiophosphate esters, has stimulated great interest in organic dithiophosphate chemistry and encouraged further work toward development of novel organophosphorus compounds having desirable biological activity and in methods of producing them.

In the present invention, new types of dialkyl dithiophosphate esters, i.e., novel O,S'-dialkyl S-hydrocarbylthioalkyl dithiophosphates, are disclosed. Their synthesis via a new process involving selective dealkylation-alkylation is described. It is also disclosed herein that the new unsymmetrically substituted O,S'-dialkyl dithiophosphate esters are unusually active and safe pesticides.

PROCESS REACTANTS

In accordance with this invention O,S'-dialkyl S-hydrocarbylthioalkyl dithiophosphates are prepared from dithiophosphate esters selected from the group consisting of S-hydrocarbylthioalkyl and S-alkenyl esters of O,O'-dialkyl dithiophosphoric acids. Said preparations comprise a combination of dealkylation and alkylation reactions both in the liquid phase. Most generally this combination of reactions can be schematically represented in the following manner:

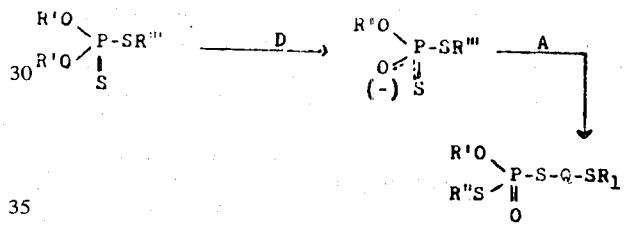

wherein R' and R'' are alkyl groups: R''' is a hydrocarbylthioalkyl radical or an alkyl group having olefinic unsaturation; $R_1$ is a hydrocarbyl group; Q is a nonsubstituted or substituted alkylene group; D is a dealkylating agent, preferably a nitrogen or phosphorus base or a thiolate or inorganic salt; A is an alkylation agent preferably an alkyl halide, alkyl sulfonate, dialkyl sulfate, alkyl phosphate, trialkyl phosphite or the combination of such an alkylating agent with another alkylating agent such as a thiol.

If R''' is a hydrocarbylthioalkyl radical, only one alkylating agent is used according to the following scheme:

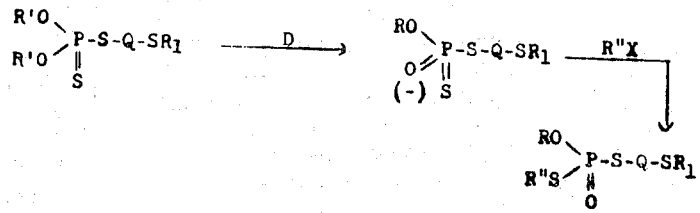

wherein all the symbols are as previously defined and the additional R''X symbol represents an alkylating agent such as an alkyl halide, alkyl sulfonate, alkyl phosphate, etc.

If R''' is an alkyl group having olefinic unsaturation, a combination of two types of alkylating agents is used according to the following scheme:

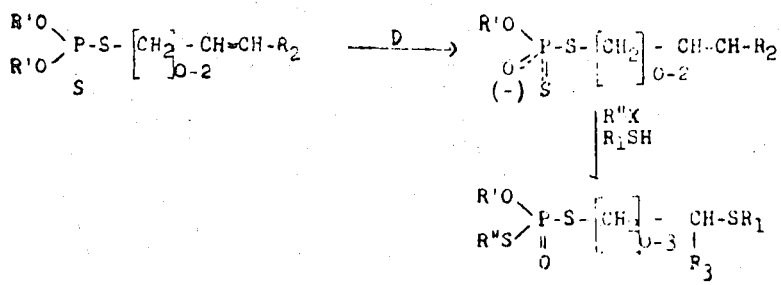

wherein all the symbols are as previously defined, $R_1SH$ representing an aliphatic or aromatic thiol, and $R_2$ and $R_3$ being a hydrogen or alkyl group.

While the present process is operative independent of the carbon number of the aliphatic and aromatic groups in the reactants, it is nevertheless preferred to use reactants limited in molecular weight and structure. Particularly, stringent limitations are necessary with regard to the reactants of the present process, if the superior novel pesticidal compositions are to be prepared.

The dithiophosphate reactants of the present process

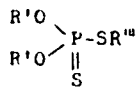

have molecular weights preferably below 800, most preferably below 400. Furthermore, it is preferred that $R'$ be a $C_1$ to $C_{16}$ primary or secondary alkyl group. More preferably, $R'$ is a $C_1$ to $C_8$ primary alkyl group. Most preferably $R'$ is ethyl and methyl; most specifically, $R'$ is ethyl.

The $R'''$ group of the phosphorus reactant can be a substituted or unsubstituted thioalkyl radical having one to 30 carbon atoms, i.e., having a molecular weight, preferably below 400, most preferably below 200, or $R'''$ can be an alkyl group having olefinic unsaturation having one to eight carbon atoms, i.e., having molecular weights below 100, most preferably below 60.

In case the dithiophosphate ester reactant has the general formula:

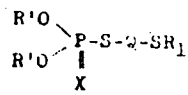

the preferred meaming of $R'$ is as previously defined.

$R_1$ is preferably a $C_1$ to $C_{16}$ alkyl radical, phenyl, or a $C_6$ to $C_8$ substituted phenyl radical, more preferably the alkyl radicals are $C_1$ to $C_8$ alkyl radicals, and most preferably they are $C_1$ to $C_3$ alkyl groups; Q is preferably a $C_1$ to $C_{16}$ alkylene or a $C_1$ to $C_{16}$ substituted alkylene group, more preferably a $C_1$ to $C_8$ alkylene or $C_1$ to $C_8$ monosubstituted alkylene group, most preferably a $C_1$ to $C_4$ alkylene group.

Non-limiting examples of suitable O,O'-dialkyl S-hydrocarbylthioalkyl dithiophosphate reactants having the above formula include the following:

Diethyl methylthiomethyl dithiophosphate, dihexadecyl ethylthiopropyl dithiophosphate, diethylhexyl propylthioethyl dithiophosphate, dimethyl phenylthiomethyl dithiophosphate, diethyl chlorophenylthiomethyl dithiophosphate, diethyl cyanotolylthioethyl dithiophosphate, diethyl trichlorophenylthiopropyl dithiophosphate, diethyl methylthiofluoropropyl dithiophosphate, diethyl propylthiocyanobutyl dithiophosphate, methyl ethyl propylthiobutyl dithiophosphate, etc.

In case the dithiophosphate ester reactant has the general formula:

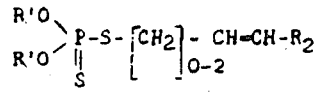

the preferred meaning of $R'$ is $C_1$ to $C_{16}$ primary or secondary alkyl radical, $R_2$ is preferably hydrogen or a $C_1$ to $C_{16}$ alkyl radical, the alkyl radical more preferably being in the $C_1$ to $C_3$ range. Nonlimiting examples of suitable O,O'-dialkyl S-alkenyl dithiophosphate reactants include the following:

Dimethyl propenyl dithiophosphate, dioctyl butenyl dithiophosphate, dihexadecyl octenyl dithiophosphate, diethyl hexadecenyl dithiophosphate, diethyl vinyl dithiophosphate, dipropyl pentenyl dithiophosphate, methyl ethyl hexenyl phosphate, dicyclohexyl allyl dithiophosphate, diethyl cyanocrotyl dithiophosphate, diethyl methylthiopropenyl dithiophosphate, dimethyl dimethylcarboxamidovinyl dithiophosphate, etc.

The dealkylating agents for the O,O'-dialkyl dithiophosphate esters are preferably selected from the following groups:

| $(R_4)_3G$ | $R_5SM$ | $XM$ |
|---|---|---|
| I | II | III | wherein $R_4$ is hydrogen, a $C_1$ to $C_8$ alkyl or monosubstituted alkyl, preferably hydrogen and $C_1$ to $C_4$ alkyl, most preferably methyl, G is a nitrogen or phosphorus base; $R_5$ is a $C_1$ to $C_8$ hydrocarbyl, preferably $C_1$ to $C_4$ alkyl; M is an alkali or alkaline earth metal, or tetraalkyl ammonium; X is chlorine, bromine or iodine.

Nonlimiting, suitable dealkylating reagents for the O,O'-dialkyl dithiophosphate esters are exemplified by the following compounds:

I. Ammonia, propylamine, diethylamine, trimethylamine, tetramethylethylenediamine, N-methyl pyrrolidine, hydroxyethylamine, benzyldimethylamine, triethylenediamine, trimethylphosphine, tributylphosphine, phosphine and other nitrogen and phosphorus bases.

II. Sodium methanethiolate, potassium ethanethiolate, potassium ethylxanthate, tetramethylammonium propanethiolate, sodium hydrogen sulfide, and other thiolate salts.

III. Lithium chloride, sodium iodide, calcium chloride, tetrabutylammonium iodide, tetrahexylphosphonium bromide, and similar metal and ammonium salts.

The dealkylation reaction of O,O'-dialkyl S-hydrocarbylthioalkyl dithiophosphates by nitrogen and phosphorus bases is shown by the following scheme:

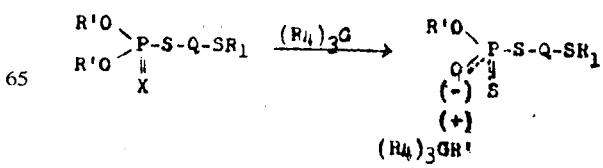

A similar dealkylation by thiolates is shown below:

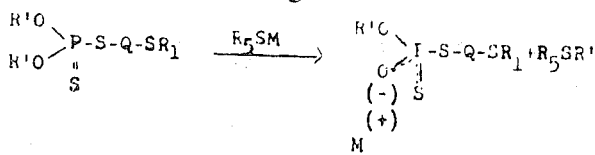

If the dealkylating reagent is a salt, a trialkyl amine or a trialkylphosphine, the resulting products of dealkylation are phosphate salts of ionic character. However, in the case of not completely substituted amines and phosphines the product is partly hydrogen bonded:

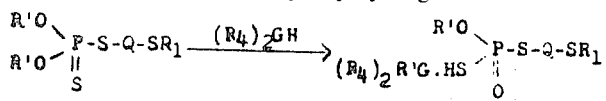

The reactions of olefinically unsaturated O,O'-dialkyl dithiophosphates, in general occur in the manner described in our previous application, U.S. Ser. No. 749,575, now U.S. Pat. No. 3,662,034, whose disclosure in this regard is incorporated herein by reference. Such reactions are a part of the present multistep process.

The dealkylation of alkylthioalkyl O,O'-dialkyl dithiophosphates also occurs selectively with the removal of an O-alkyl group. It is surprising to observe that the dealkylation of 2-alkylthioethyl O,O'-dialkyl dithiophosphates does not result in the removal of alkylthioethyl groups which are believed to be stabilized in the form of the corresponding episulfonium ions.

The alkylation of s-alkylthioalkyl O-alkyl dithiophosphate salts and complexes is also a highly selective process. It occurs exclusively on the sulfur atom to yield the corresponding S-alkylthioalkyl O,S'-dialkyl dithiophosphates. With metal salts, for example, the following reaction occurs.

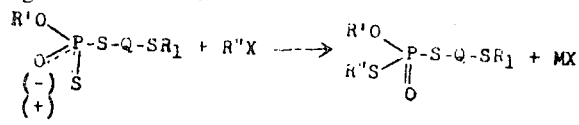

wherein R'' is a $C_1$ to $C_{16}$ primary or secondary alkyl group, preferably a $C_1$ to $C_8$ primary alkyl group, more preferably a $C_3$ to $C_4$ primary alkyl group, and most preferably n-propyl group; X is the leaving group in the alkylating process, representative examples of X being bromine, chlorine, iodine, phosphate, sulfonate, etc.

Suitable, nonlimiting examples of the alkylating agents include methyl bromide, ethyl chloride, isopropyl iodide, hexadecyl chloride, methyl tosylate, trimethyl phosphite, trimethyl phosphate, tripropyl phosphite, etc.

The net result of the dealkylation-alkylation processes from the viewpoint of the types of chemical structures involved is the isomerization of a thionothiolphosphate to a dithiolphosphate ester. In the case of the hydrocarbylthioalkyl dithiophosphates, these processes provide the final pesticidal products of this invention. Starting with unsaturated dithiophosphates, however, necessitates the use of an additional process step, i.e., the addition of a thiol to the unsaturated dithiolphosphate:

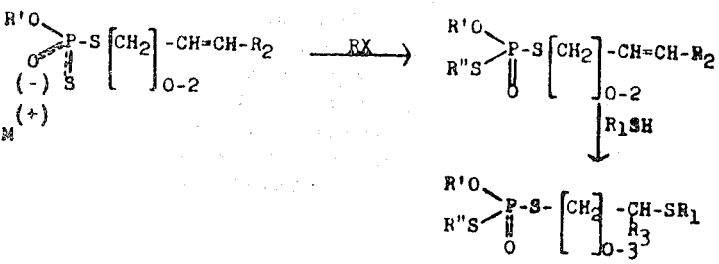

wherein all of the above symbols are as previously defined. Examples of useful thiols are: methanethiol, hexadecanethiol, propanethiol, octanethiol, benzenethiol, toluenethiol, chlorobenzenethiol, trichlorobenzenethiol, cyclohexanethiol, methylsulfonylbenzenethiol, cyanobenzenethiol, etc.

The addition of thiols to the unsaturated dithiolphosphates can result in the attachment of the thiol sulfur at either of the olefinic carbons. In the case of terminally unsaturated dithiolphosphates, a free radical type thiol addition results in primary sulfide derivatives, i.e., addition occurs in an anti-Markovnikov manner:

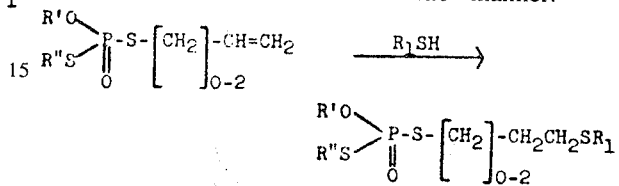

Radical type addition to vinylic dithiolphosphates, in general, occurs in a highly selective manner

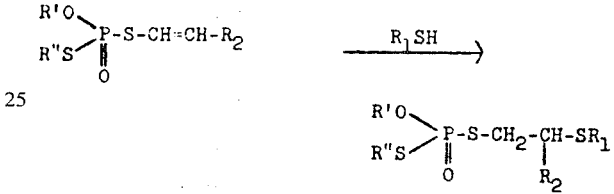

In contrast, radical addition to internally allylic compounds yields dithiolphosphate adducts having sulfur substitution mainly on the unsaturated carbon closer to the phosphorus; e.g.

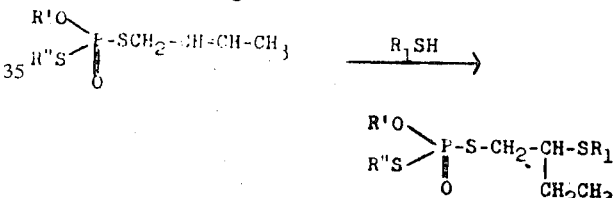

PROCESS CONDITIONS

The unsaturated dithiophosphate reactants of the present invention can be advantageously prepared by the monoaddition of O,O'-dialkyl dithiophosphoric acids to dienes and acetylenes. The hydrocarbylthioalkyl dithiophosphate reactants can be prepared by displacement reactions described in the Schrader monograph quoted earlier and by selective thiol additions.

The process conditions for the dealkylation and alkylation of unsaturated dithiophosphates are described in U.S. Ser. No. 749,575. The dealkylation and alkylation of hydrocarbylthioalkyl dithiophosphates can be carried out in a similar manner.

For the dealkylation, preferably equimolar reactants are used. However, an excess of the base reactant may be employed with advantage. The dealkylation can be carried out with or without solvent. The use of a solvent is, however, usually preferred. The utilization of strongly polar, neutral organic solvents such as acetonitrile, ethanol, and acetone is particularly advantageous.

Dealkylating temperatures can vary from about −50° to about +150°C., preferably from about 25° to about 120°C. The pressure employed is usually atmospheric. In the case of volatile dealkylating agents, however, superatmospheric pressures up to 50 atmospheres can be used to keep the reactants in the liquid reaction phase.

The dealkylation reaction is carried out for a time sufficient to substantially convert the starting dithiophosphate ester to the corresponding salt. Reaction times ranging from one to one hundred hours are common, periods ranging from three to twenty four hours are preferred. Unduly prolonged reaction time, too severe conditions and excess dealkylating agent may result in undesirable double dealkylation. After the dealkylation, the excess dealkylating agent is removed since it usually interferes with the formation of neutral phosphate esters in the subsequent alkylation stage.

In the alkylation process, the use of equimolar reactants is again preferred. Especially, in the case of amine- and phosphine- dithiophosphate complexes, additional amounts of the alkylating agent can be used to react with the base component of the complex:

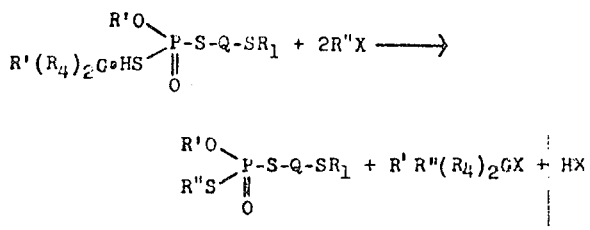

The alkylation can be carried out with or without a solvent. It is usually advantageous to use a solvent. The preferred solvents are polar organic compounds such as nitriles, ketones, alcohols, etc. Hydrocarbons and their chlorinated derivatives such as xylene, chlorobenzene, etc., are also suitable. An excess of the alkyl halide reactant can be used to serve as a solvent as well.

The alkylating temperatures can vary from about 0° to 150°, preferably from about 25° to about 120°C. The temperature of the reaction mixture can be brought up to a point where the alkylation occurs at an advantageous rate. It is often preferable, however, to heat up one reactant to the desired reaction temperature and then to add the other.

The pressure of the alkylations is usually atmospheric. In the case of volatile alkyl halide reactants, however, the use of superatmospheric pressures can be preferable in order to keep them in the liquid reaction phase. Pressures up to about 50 atmospheres can be used.

Besides a possible change of elemental composition, dealkylation followed by alkylation leads to a structural isomerization of the phosphate ester. The combination of the two processes, for the isomerization of S-alkenyl O,O'-dialkyl thionothiolphosphates to the corresponding O,S'-dithiolphosphates is described in U.S. Ser. No. 749,575. Other olefinically unsaturated thionothiolphosphates can be isomerized in a similar manner. For the synthesis of the pesticidal hydrocarbylthioalkyl O,S'-dialkyl dithiophosphates of the present invention, such an isomerization is followed by thiol addition. Starting with hydrocarbylthioalkyl O,O'-dialkyl dithiophosphates, isomerization can provide the desired compositions in one step, by combining the following reactions:

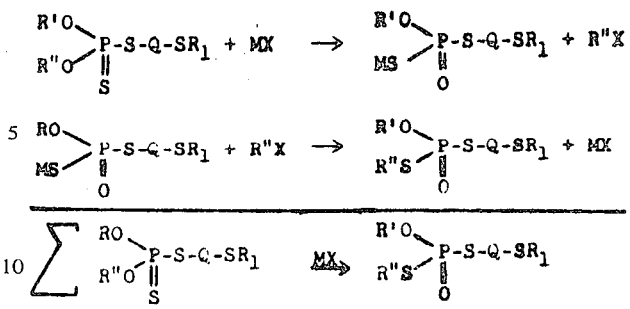

wherein $R' = R''$. such an isomerization reaction can be carried out catalytically since either the metal or the tetraalkyl ammonium or the tetraalkyl phosphonium halide salt is regenerated.

The amount of the salt catalysts is from 0.5 to 20%, preferably from 1 to 5%. The temperature and pressure limits are the same as in the stepwise alkylation and dealkylation processes. It is important, however, to use a solvent in which the catalyst is soluble under the reaction conditions. Such solvents include ether alcohols such as ethoxyethanol. The use of higher temperatures between 60° and about 140°C. and superatmospheric pressures up to 50 atmospheres is preferred to achieve practical conversion rates with a small amount of the salt reactant, i.e., catalyst.

The S-organothioalkyl O,S'-dialkyl dithiophosphate products of the present invention can be readily oxidized to the corresponding sulfoxides and sulfones:

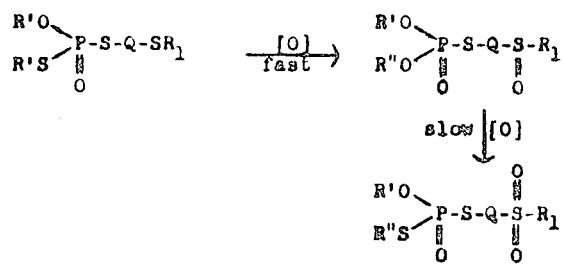

It is preferred to use chemical oxidants such as peroxides, particularly aqueous hydrogen peroxide, for these oxidations. Other suitable oxidants include nitric acid, permanganates, bromine, etc. The oxidations occur under conditions known for similar reactions of simple sulfides. Acetic acid and acetic anhydride can be used with advantage for hydrogen peroxide oxidation because their application leads to the formation of the specially active oxidant intermediate, i.e., peracetic acid. Sulfuric acid can be also used as a catalyst.

The first oxidation step yielding the sulfoxide compound is relatively fast. Consequently, the sulfoxide can be readily produced under mild conditions without the concurrent formation of significant amounts of the sulfone. Using peroxide, the sulfoxide is preferably prepared at temperatures between 0° and 40°C. For the preparation of the sulfone, temperatures preferably between 25° and 80°C. are used.

The oxidation of S-alkylthioalkyl O,S'-dialkyl dithiophosphates can be advantageous with respect to their pesticidal use since the sulfoxide and sulfone derivatives are ordinarily expected to be more stable towards hydrolysis as described in the earlier quoted Schrader monograph. Schrader also describes that there is evidence that such oxidation also occurs in plants and animals and leads to highly active, systemic insecticides.

PRODUCT COMPOSITIONS

The new products of the process claimed in the present invention are O-alkyl S'-higher alkyl hydrocarbylthioalkyl dithiophosphates. The new compositions are represented by the following general formula:

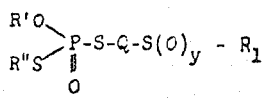

wherein: (a) R' is an alkyl group, preferably $C_1$ to $C_{16}$ primary and secondary alkyl, more preferably $C_1$ to $C_8$ primary and secondary alkyl, most preferably methyl or ethyl, especially ethyl; (b) R'' is an alkyl group having three or more carbon atoms, preferably $C_3$ to $C_{16}$ alkyl, more preferably $C_3$ to $C_8$ alkyl, most preferably propyl and butyl, especially n-propyl and primary isobutyl; (c) $R_1$ is a $C_1$ to $C_{16}$ substituted or nonsubstituted hydrocarbyl group, preferably $C_1$ to $C_{16}$ alkyl, phenyl, substituted phenyl containing such exemplary substituents as halogen, alkylthio, alkylsulfonyl, cyano, alkyl, nitro, more preferably $C_1$ to $C_8$ alkyl, chlorinated phenyl, most preferably $C_1$ to $C_3$ alkyl, 4-chlorophenyl; (d) Q is an unsubstituted or substituted alkylene group, preferably having $C_1$ to $C_{16}$ carbon atoms and, when substituted, having such exemplary substituents as phenyl, chlorophenyl, halogen, alkylthio, alkylsulfonyl; more preferably being $C_1$ to $C_8$ alkylene and $C_1$ to $C_8$ monosubstituted alkylene groups and most preferably, $C_1$ to $C_4$ alkylene group and (e) y is 0 to 2, preferably 0.

The preferred compositions of the present invention include compounds of the following general structures:

(a) 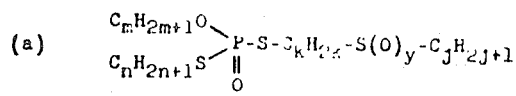

wherein m is 1 or 2, preferably 2; n is 3 or 4, preferably 3; k and j are 1 to 4, preferably 1 – 3; y is 0 – 2, preferably 0 and the S-alkyl group being most preferably n-propyl.

(b) 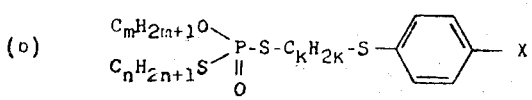

wherein m and n are as previously defined in (a) above; k is 1 to 4, preferably 1; and X is hydrogen, halogen, methylthio, methylsulfonyl or cyano, etc., preferably chlorine.

More specific compositions of the present invention include:

(i) 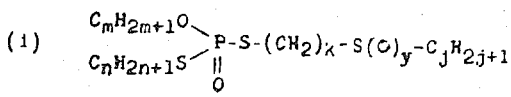

wherein the meaning of m, n, k and y is as previously defined and j is 1 to 4, preferably 1 to 3.

(ii) 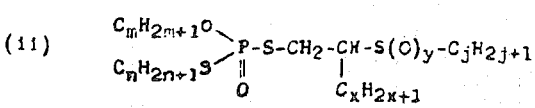

wherein the meaning of m, n, j and y is as previously defined, and x is 1 to 2, preferably 1.

Most specific compositions of the present invention include:

(1) 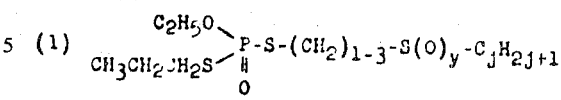

wherein j is 1 to 3 and y is 0 – 2, preferably 0.

(2) 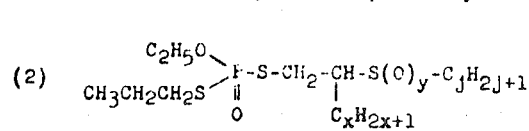

wherein j is 1 – 3; and x is 1 – 2, preferably 1.

Non-limiting examples of the S-hydrocarbylthioalkyl O,S'-dialkyl dithiophosphate compositions include, e.g.:

Methylthiomethyl O-methyl S'-propyl dithiophosphate,
chlorophenylthiomethyl O-hexadecyl S'-butyl dithiophosphate,
propylthiomethyl O-ethyl S'-hexadecyl dithiophosphate,
hexadecylthioethyl O-ethyl S'-butyl dithiophosphate,
ethylthiohexadecyl O-ethyl S'-propyl dithiophosphate,
methylthiooctyl O-ethyl S'-propyl dithiophosphate,
methylthiobutyl O-butyl S'-propyl dithiophosphate,
xylylthiomethyl O-ethyl S'-octyl dithiophosphate,
butylthiopropyl O-octyl S'-propyl dithiophosphate,
trichlorophenylthiomethyl O-ethyl S'-propyl dithiophosphate,
bis-methylthiopropyl O-ethyl S'-propyl dithiophosphate,
methylsulfonylphenylthiomethyl O-ethyl S'-propyl dithiophosphate,
ethylsulfonylethyl O-ethyl S'-propyl dithiophosphate,
ethylsulfonylpropyl O-ethyl S'-butyl dithiophosphate,
ethylsulfonylbutyl O-ethyl S'-propyl dithiophosphate, and
chlorophenylsulfonyl O-ethyl S'-propyl dithiophosphate.

PESTICIDE COMPOSITIONS

While the above compositions are believed to be all novel and can be prepared by the process of this invention, they have widely different properties with respect to pesticidal activity. For economical pesticidal uses, certain novel compositions are preferred, although in general all possess some measure of pesticidal activity.

The novel S-hydrocarbylthioalkyl O-alkyl S'-higher alkyl dithiophosphate pesticides preferably have a molecular weight of less than 800, more preferably less than 400. For high activity, the O-alkyl group should be preferably methyl or ethyl, most preferably ethyl. Surprisingly, the S-alkyl group should be preferably $C_3$ or $C_4$ for high activity. Most specifically, it should be n-propyl or primary i-butyl. The hydrocarbylthioalkyl part of the molecule should preferably have as a hydrocarbyl group a $C_1$ to $C_3$ alkyl, a phenyl or $C_1$ to $C_8$ substituted phenyl such as chlorophenyl, trichlorophenyl, methylsulfonyltolyl, etc. The thioalkyl moiety should have one to four carbon atoms in the alkylene chain connecting the two sulfur atoms. This chain can be substituted, preferably with halogen and $C_1$ to $C_8$ organic radicals, preferred examples of the latter being methyl, ethyl, phenyl, chlorophenyl, methylsulfonylphenyl, etc.

The preferred pesticidal compositions contain as an active ingredient one or more compounds of the general formula:

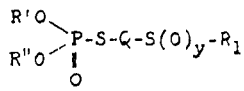

wherein R' is methyl or ethyl, preferably ethyl; R'' is $C_3 - C_4$ alkyl, preferably n-propyl; y is 0 – 2, preferably 0; $R_1$ is $C_1$ to $C_3$ alkyl, phenyl, or $C_6$ to $C_8$ substituted phenyl; and Q is $C_1$ to $C_{12}$, preferably a $C_1$ to $C_4$ unsubstituted or substituted alkylene group.

While many of the preferred pesticidal dithiophosphates of the present invention have the well known lower O-alkoxy and S-hydrocarbylthioalkyl esterifying groups, their higher S'-alkyl group is believed to be novel. Most specifically these unsymmetrical compositions exhibit the presence of S-n-propyl or S-primary-i-butyl groups. Unexpectedly, these groups contribute very desirable, superior pesticidal properties to these pesticidal compositions, whereas similar known unsymmetrical O,S'-dialkyl esters having S-methyl or S-ethyl groups, show an insecticidal activity markedly inferior to that of the corresponding symmetrical esters.

Among the desirable pesticidal properties, the activity of the novel compositions against the army worm is particularly outstanding. In view of the very high resistance of the army worm against most of the known pest control chemicals, this activity is very important.

It is similarly unexpected and important that the novel compositions have low toxicities against warm blooded animals and are therefore safe to use. The appearance of the low toxicity is again specifically associated with the presence of the S-n-propyl or S-primary isobutyl groups in these molecules. This low toxicity coupled with high pesticidal activity, i.e., high therapeutical index, is essential for animal health applications.

As previously noted, the esters of this invention are useful as pesticides, particularly as insecticides. When used as insecticides, they are preferably formulated with a suitable carrier or diluent or combinations thereof.

The term "carrier" or "diluent" as used herein means a material which can be inorganic or organic and synthetic or of natural origin, with which the active ingredient or ingredients of this invention can be mixed to facilitate its storage, transportation and handling, and application to the insects to be treated. The carrier is preferably biologically and chemically inert, and, as used, can be a solid or a fluid. When solid carriers are used, they are preferably particulate, granular, or pelleted; however, other shapes and sizes of solid carriers can be employed as well. Such preferably solid carriers can be naturally occurring materials; although subsequently subjected to grinding, sieving, purification, and/or other treatments — including for example, gypsum, tripolyte; diatomaceous earth; mineral silicates, such as mica, vermiculite, talc, and pyrophyllite; clays of the montomorillonite, kaolinite, or attapulgite groups; or calcite and dolomite; etc. Carriers produced synthetically, as for example, synthetic hydrated silica oxides and synthetic calcium silicates can also be used, and many proprietary products of this type are available commercially. The carrier can also be an elemental substance such as sulfur or carbon, preferably an activated carbon. If the carrier possesses intrinsic catalytic activity such that it would decompose the active ingredient, it is advantageous to incorporate a stabilizing agent, as, for example, polyglycols such as diethylene glycol to neutralize this activity and thereby prevent possible decomposition of the active ingredient.

For some purposes, a resinous or waxy carrier can be used, preferably one which is solvent-soluble or thermoplastic, including fusible. Examples of such carriers are natural or synthetic resins such as a coumarin resin; rosin; copal; shellac; dammar; polyvinyl chloride; styrene polymers and copolymers; a solid grade of polychlorophenol such as is available under the registered trademark "Arochlor;" a bitumen; an asphaltite; a wax, for example, beeswax or a mineral wax such as paraffin wax or Montan wax, or a chlorinated mineral wax or a microcrystalline wax such as those available under the registered trademark "Mikrovan Wax." Compositions comprising said resinous or waxy carriers are preferably in a granular or pelleted form.

Fluid carriers can be liquids, as for example, water, or an organic fluid, including liquefied, normally gaseous materials, and can be solvents or nonsolvents for the active material. For example, the horticultural petroleum spray oils boiling in the range of from about 275° to about 575°F., or boiling in the range of from about 575° to about 1,000°F., and having an unsulfonatable residue of at least about 75% and preferably of at least about 90%, or mixtures of these two types of oils are particularly suitable liquid carriers.

The carrier can be mixed or formulated with the active material during its manufacture or at any stage subsequently. The carrier can be mixed or formulated with the active material in any proportion depending upon the nature of the carrier. One or more carriers, moreover, can be used in combination.

The compositions of this invention can be concentrated, suitable for storage and transport, and contain, for example, from about 5 to about 95% by weight of the active ingredient, preferably from about 20 to about 80% by weight. These concentrates can be diluted with the same or a different carrier to a concentration suitable for application. The compositions of this invention can also be dilute compositions suitable for application in a manner well known in the art. In general, concentrations of about 0.1 to about 10% by weight of the active material, based upon the total weight of the composition, are satisfactory, although lower and higher concentrations can be applied if necessary.

The compositions of this invention can also be formulated as dusts. These comprise an admixture of the active ingredient and a finely powdered solid carrier such as aforedescribed. The powdered carriers can be oil-treated to improve adhesion to the surface to which they are applied. These dusts can be concentrates, in which case a highly sorptive carrier is preferably used. These require dilution with the same or different finely powdered carriers, which can be of lower sorptive capacity to a concentration suitable for application.

The compositions of this invention can also be formulated as wettable powders comprising a major proportion of the active ingredient mixed with a dispersant, i.e., a deflocculating or suspending agent, and, if desired, a finely divided solid carrier and/or a wetting agent. The active ingredient can be in particulate form or adsorbed on the carrier, and preferably constitutes at least about 10%, more preferably at least about 35%, by weight, of the final pesticidal composition. The concentration of the dispersing agent should in general be between about 0.5 and about 5% by weight of the total composition, although larger or smaller amounts can be used if desired.

The dispersant or dispersing agent used in the compositions or formulations of this invention can be any substance having definite dispersant, i.e., deflocculating or suspending properties as distinct from wetting properties, although the substances can also possess wetting properties as well.

The dispersant or dispersing agent used can be a protective colloid such as gelatin, glue, casein, gums, or a synthetic polymeric material such as polyvinyl alcohol and methyl cellulose, etc. Preferably, however, the dispersants or dispersing agents used are sodium or calcium salts of high molecular weight sulfonic acids, as for example, the sodium or calcium salts of ligninsulfonic acids derived from sulfite cellulose waste liquors. The calcium or sodium salts of condensed aromatic sulfonic acids, for example, the products known as "Tamol 731," are also suitable.

The wetting agents used can be nonionic type surfactants, as for example, the condensation products of fatty acids containing at least 12, preferably 16 to 20, carbon atoms in the molecule or abietic acid or naphthenic acid obtained in the refining of petroleum oil fractions with alkylene oxides such as ethylene oxides or propylene oxides, or with both ethylene oxide and propylene oxide, as for example, the condensation products of oleic acid and ethylene oxide containing about six to 15 ethylene oxide units in the molecule. Other nonionic wetting agents like polyalkylene oxide polymers, commercially known as "Pluronics" can be used. Partial esters of the above acids with polyhydric alcohols such as glycerol, polyglycerol, sorbitol or mannitol, etc. can also be used.

Suitable anionic wetting agents include the alkali metal salts, preferably sodium salts, of sulfuric acid or sulphonic acids containing at least 10 carbon atoms in a molecule; for example, the sodium secondary alkyl sulfates, dialkyl sodium sulfosuccinates available under the registered trademark "Teepol," sodium sulfonates, castor oil, sodium dodecylbenzene sulfonate, etc.

Granulated or pelleted compositions comprising a suitable carrier having the active ingredients incorporated therein are also included in this invention. These can be prepared by impregnating a granular carrier with a solution of an active ingredient or by granulating a mixture of a finely divided carrier and the active ingredients. The carrier used can contain a fertilizer or a fertilizer mixture, such as for example, a superphosphate.

The compositions of this invention can be formulated also as solutions of the active ingredients and an organic solvent or mixtures of solvent, such as for example, alcohols; ketones, especially acetone; ethers; hydrocarbons; etc. When the toxicant itself is a liquid, it can be sprayed upon the insects or fungi without further dilution.

Petroleum hydrocarbon fractions used as solvents should preferably have a flash point of about 73°F., an example of this being a refined aromatic extract of kerosene. Auxiliary solvents such as alcohols, ketones, and polyalkylene glycol ethers and esters can be used in conjunction with these petroleum solvents.

Compositions of the present invention can also be formulated as emulsifiable concentrates which are concentrated solutions or dispersions of the active ingredients in an organic liquid, preferably a water-insoluble organic liquid containing an added emulsifying agent. These concentrates can also contain a proportion of water, for example, 50% by volume, based upon the total composition to facilitate subsequent dilution with water. Suitable organic liquids include, e.g., the above petroleum hydrocarbon fractions previously described.

The emulsifying agents or emulsifiers are generally of the type producing water-in-oil type emulsions which are suitable for application by low volume spraying, or they can be emulsifiers of the type producing oil-in-water emulsions producing concentrates which can be diluted with relatively large volumes of water for application by high volume spraying or relatively small volumes of water for low volume spraying. In such emulsions, the active ingredient is preferably in a nonaqueous phase.

The present invention is further illustrated in greater detail by the following examples, but it is to be understood that the present invention, in its broadest aspects, is not necessarily limited in terms of the reactants or specific temperatures, residence times, separation techniques, and other process conditions, etc.; or dosage levels, exposure times, insects used, etc. by which the compounds and/or formulations described and claimed are prepared and/or used.

SYNTHESIS OF S-HYDROCARBYLTHIOALKYL O,S′-Dialkyl DITHIOPHOSPHATES FROM THEIR O,O′-DIALKYL ISOMERS

EXAMPLE 1

O,S-Diethyl S′-2-Ethylthiopropyl Dithiophosphate

O,O′-Diethyl S-1-(2-ethylthiopropyl) dithiophosphate (11.6 g., 0.04 mole) and 4.5 g (0.04 mole) of 1,4-diazabicyclo [2.2.2] octane, i.e., triethylenediamine, were stirred at ambient temperature for 24 hours. The resultant viscous liquid was dissolved in 100 ml. of acetonitrile and 8.7 g. (0.08 mole) of bromoethane were added. The solution was heated to 70°C. for 4 hours and cooled to ambient temperature. A white solid precipitated. This and the acetonitrile were dissolved in 50 ml. of water. The water phase then was separated and washed with 250 ml. of ether. The combined organic layers were washed with 50 ml. of 5% aqueous NaHCO$_3$, dried over anhydrous MgSO$_4$, and the solvent removed under vacuum under pressures down to 0.1 mm Hg. The liquid residue weighed 8.7 g. (87% pure by gas liquid chromatography, i.e., glc.)

Analysis. Calculated for C$_9$H$_{21}$O$_2$PS$_3$: C, 37.47; H, 7.28; P, 10.77. Found: C, 37.28; H, 7.20; P, 10.56.

EXAMPLE 2

O-Ethyl-S-1-Propyl S′-2-Ethylthioethyl Dithiophosphate

According to the procedure of Example 1, 27.4 g (0.1 mole) of O,O′-diethyl S-1-(2-ethylthioethyl) dithiophosphate, 11.2 g (0.1 mole) of triethylene diamine and 12.3 g (0.1 mole) of 1-bromopropane were reacted to give 16.0 g. of a 79% pure product by glc.

Analysis. Calculated for $C_9H_{21}O_2PS_3$: C, 37.47; H, 7.28; P, 10.77; Found: C, 36.92; H, 7.27; P, 10.61.

EXAMPLE 3

O-Ethyl S-1-Propyl S'-Ethylthiomethyl Dithiophosphate

According to the procedure of Example 1, 26.0 g. (0.1 mole) of O,O'-diethyl S-ethylthiomethyl dithiophosphate, 11.2 g. (0.1 mole) of triethylenediamine and 24.6 g. (0.2 mole) of 1-bromopropane were reacted to give 10.0 g. of a residual product whose structure was confirmed by nuclear magnetic resonance spectroscopy (nmr).

Analysis. Calculated for $C_8H_{19}O_2PS_3$: C, 35.03; H, 6.92; P, 11.31. Found: C, 36.09; H, 6.92; P, 11.54.

EXAMPLE 4

O-Ethyl S-1-Propyl S'-4 Chlorophenylthiomethyl Dithiophosphate

According to the procedure of Example 1, 68.5 g (0.2 mole) of O,O'-diethyl S-4-chlorophenylthiomethyl dithiophosphate, 22.4 g (0.2 mole) triethylene diamine and 49.2 g (0.4 mole) of 1-bromopropane were reacted to give 52 g. of a residual product whose structure was confirmed by nmr.

Analysis. Calculated for $C_{12}H_{18}ClO_2PS_3$: C, 40.41; H, 5.05; P, 8.69. Found: C, 40.23; H, 5.12; P, 8.49.

EXAMPLE 5

O-Hexadecyl S-Dodecylthio S'-4-Octylthiobutyl Dithiophosphate

O,O'-Dihexadecyl S-4-octylthiobutyl dithiophosphate is reacted with a 10 mole per cent excess of trimethylamine at 70°C. in a closed, effectively stirred pressure vessel to yield substantially pure O-hexadecyl S-4-octylthiobutyl dithiophosphoric acid hexadecyl trimethyl ammonium salt. After the removal of the excess trimethylamine, the salt is reacted with dodecyl bromide to give the desired product, whose structure can be confirmed by nmr.

SYNTHESIS OF S-HYDROCARBYLTHIOALKYL O,S'-DIALKYL

DITHIOPHOSPHATES FROM S-OLEFINIC DITHIOPHOSPHATES

As was disclosed earlier in the specification, this method of synthesis involves (1) the dealkylation of S-olefinic O,O'-dialkyl dithiophosphates (2) the reaction of the resulting salts with alkylating agents to yield the corresponding S'-olefinic O,S-dialkyl dithiophosphates and (3) the reaction of the latter with thiols to yield the desired compositions of this invention.

Several examples for steps (1) and (2) of this synthetic approach were given in copending U.S. application Ser. No. 749,575. The following examples 6–20 are set forth essentially to illustrate the carrying out of foregoing step (3).

EXAMPLE 6

Preparation of O-Ethyl S-1-Propyl S'-2-Methylthiopropyl Dithiophosphate

A quartz tube was charged with 48.0 g. (0.2 mole) of O-ethyl S-1-propyl S'-propenyl dithiophosphate and evacuated to 0.1 mm Hg. The tube was then cooled in a dry-ice-isopropanol bath and 18.1 g. (0.37 mole) of methanethiol were added. The tube was sealed and irradiated in a water bath with ultraviolet (UV) radiation from three 100 Watt Hanau immersion lamps at 15° from a distance of 6 cm. After 24 hours, the reaction was complete, as determined by gas chromatography (glc), and the excess methanethiol was removed under vacuum (0.1 mm). The residue was dissolved in 500 ml. of ether and washed with 50 ml. of 5% aqueous sodium bicarbonate. The ether solution was dried over anhydrous magnesium sulfate, and the solvent was removed under reduced pressure. The yield of O-ethyl S-1-propyl S'-1-(2-methylthiopropyl) dithiophosphate was 53.7 g. (85% pure by glc). The boiling point of the product was 127°–129°C. at 0.08 mm Hg.

Analysis. Calculated for $C_9H_{21}O_2PS_3$: C, 37.47; H, 7.28; P, 10.77. Found: C, 37.53; H, 7.28; P, 11.34.

EXAMPLE 7

O-Ethyl S-1-Propyl S'-2-Ethylthiopropyl Dithiophosphate

This compound was prepared from 48.0 g (0.2 mole) of O-ethyl S-1-propyl S'-propenyl dithiophosphate and 21.0 g. (0.33 mole) of ethanethiol under UV radiation according to the procedure of Example 6. The yield was 58.0 g. (82% pure by glc). The boiling point of product was 128°–129°C. at 0.17 mm Hg.

Analysis. Calculated for $C_{10}H_{23}O_2PS_3$: C, 39.76; H, 7.68; P, 10.27. Found: C, 39.91; H, 8.01; P, 9.73.

EXAMPLE 8

O-Ethyl S-1-Propyl S'-2-n-Propylthiopropyl Dithiophosphate

This compound was prepared from 48.0 g. (0.2 mole) of O-ethyl S-1-propyl S'-propenyl dithiophosphate and 23.3 g. (0.3 mole) of i-propanethiol under UV radiation according to the procedure of Example 6. The yield was 55.0 g. The product decomposed upon distillation.

Analysis. Calculated for $C_{11}H_{25}O_2PS_3$: C, 41.77; H, 7.89; P, 9.81. Found: C, 41.96; H, 7.75; P, 9.47.

EXAMPLE 9

O-Ethyl S-1-Propyl S-2-i-Propylthiopropyl Dithiophosphate

O-Ethyl S-1-propyl S'-propenyl dithiophosphate (24.0 g., 0.1 mole) and 11.4 g. (0.15 mole) 1-propanethiol were reacted according to the procedure of Example 6 to give 16.0 g. of product (50% yield).

Analysis. Calculated for $C_{11}H_{25}O_2PS_3$: C, 41.77; H, 7.89; P, 9.81; Found: C, 42.18; H, 7.84; P, 9.35.

EXAMPLE 10

O-Ethyl S-1-Propyl S'-2-n-Hexylthiopropyl Dithiophosphate

O-Ethyl S-1-propyl S'-propenyl dithiophosphate (24.0 g. 0.1 mole) and 17.5 g. (0.15 mole) 1-hexanethiol were reached according to the procedure of Example 6 to give 34.7 g. of a residual product whose structure was confirmed by nmr.

Analysis. Calculated for $C_{14}H_{31}O_2PS_3$: C, 46.77; H, 9.14; P, 8.69; Found: C, 49.53; H, 8.66; P, 7.40.

EXAMPLE 11

O-Ethyl S-2-Methylpropyl S'-2-Methylthiopropyl Dithiophosphate

This compound was prepared by reacting 5.08 g. (0.02 mole) of O-ethyl S-1-(2-methylpropyl) S'-propenyl dithiophosphate and excess methanethiol according to Example 6 to give 2.6 g. of a residual product, whose structure was confirmed by nmr.

Analysis. Calculated for $C_{10}H_{23}O_2PS_3$: C, 39.76; H, 7.68; P, 10.27; Found: C, 38.22; H, 6.95; P, 10.28.

EXAMPLE 12

O-Ethyl S-1-Propyl S'-2-Methylthiobutyl Dithiophosphate

This compound was prepared by reacting 8.6 g. (0.034 mole) of O-ethyl S-1-propyl S'-1-butenyl dithiophosphate and excess methanethiol according to the procedure of Example 6 to give 5.6 g. of a residual product whose structure was confirmed by nmr.

Analysis. Calculated for $C_{10}H_{23}O_2PS_3$: C, 39.76; H, 7.68; P, 10.27. Found: C, 39.72 H, 7.60; P, 9.75.

EXAMPLE 13

O-Ethyl S-1-Propyl S'-2-Methylthio-3,3-dimethylbutyl Dithiophosphate

This compound was prepared by reacting 6.9 g. (0.025 mole) of O-ethyl S-1-propyl S'-1-(3,3-dimethylbutenyl)dithiophosphate and excess methane thiol according to the procedure of Example 6 to give 4.3 g. of a liquid residual product whose structure was confirmed by nmr.

Analysis. Calculated for $C_{12}H_{27}O_2PS_3$: C, 43.90; H, 8.23; P, 9.45. Found: C, 44.79; H, 7.49; P, 7.25.

EXAMPLE 14

O-Methyl S-1-Propyl S'-2-Methylthiopropyl Dithiophosphate

O-Methyl S1-propyl S'-propenyl dithiophosphate (2.26 g. 0.01 mole) and excess methanethiol were reacted according to the procedure of Example 6 to give 2.0 g. of a residual product whose structure was confirmed by nmr.

Analysis. Calculated for $C_8H_{19}O_2PS_3$: C, 35.25; H, 6.94. Found: C, 31.35; H, 6.41.

EXAMPLE 15

O-Ethyl S-1-Butyl S'-2-Methylthiopropyl Dithiophosphate

O-Ethyl S-1-butyl S'-propenyl dithiophosphate (7.62 g. 0.03 mole) and excess methanethiol were reacted according to the procedure of Example 6 to give 6.2 g. of a liquid residual product whose structure was confirmed by nmr.

Analysis. Calculated for $C_{10}H_{23}O_2PS_3$: C, 39.76; H, 7.68; P, 10.27. Found: C, 40.53; H, 7.58; P, 9.50.

EXAMPLE 16

O-Ethyl S-2-Propyl S-2-Methylthiopropyl Dithiophosphate

O-Ethyl S-2-propyl S'-propenyl dithiophosphate (7.2 g. 0.03 mole) and excess methanethiol were reacted according to the procedure of Example 6 to give 6.0 g. of a residual product whose structure of compound was confirmed by nmr.

Analysis. Calculated for $C_9H_{21}O_2PS_3$: C, 37.47; H, 7.28. Found: C, 36.61; H, 7.03.

EXAMPLE 17

O,S-n-Dipropyl S'-2-Methylthiopropyl Dithiophosphate

O,-S-Dipropyl S'-propenyl dithiophosphate (10.0 g. 0.039 mole) and excess methanethiol were reacted according to the procedure of Example 6 to give 10.1 g, of 84% pure product (72% yield).

Analysis. Calculated for $C_{10}H_{23}O_2PS_3$: C, 39.76; H, 7.68; P, 10.27. Found: C, 39.99; H, 7.75; P, 10.28.

EXAMPLE 18

O-Octyl S-Hexadecyl S'-2-Trichlorophenylthiohexyl Dithiophosphate

O,O'-Dioctyl S-hexenyl dithiophosphate is dealkylated at 80°C, with trimethylamine to yield O-octyl S-hexenyl dithiophosphoric acid octyltrimethyl ammonium salt. The latter compound is alkylated with hexadecyl chloride also at 80° to give O-octyl S-hexadecyl S'-hexenyl dithiophosphate. Subsequent addition of trichlorobenzenethiol with UV initiation provides the desired final product, whose structure can be confirmed by nmr.

EXAMPLE 19

O-Methyl S-Octyl S-2-Hexadecylthiobutyl Dithiophosphate

O,O-Dimethyl S'-crotyl dithiophosphate is dealkylated with ammonia, and the resulting O-methyl S-crotyl dithiophosphoric acid methylammonium salt is reacted with octyl chloride to yield O-methyl S-octyl S'-crotyl dithiophosphate. Bis-azobutyronitrile catalyzed addition of hexadecanethiol to the latter yields a mixture of two isomeric dithiophosphate isomers, the 2-substituted S-butyl dithiophosphate isomer predominating. The structure of these isomers can be confirmed by nmr.

EXAMPLE 20

O-Ethyl S-n-Propyl S'-3-n-Propylthiopropyl Dithiophosphate

O-Ethyl S-n-propyl S'-allyldithiophosphate is reacted with a 10 molar excess of n-propanethiol under the effect of UV at 15°. The progress of the reaction is estimated by nmr spectroscopy. After the reaction is substantially complete the excess thiol is stripped in vacuo. The liquid residual product is mostly the desired dithiolphosphate ester.

GENERAL EXPERIMENTAL PROCEDURE FOR BIOLOGICAL TESTING
OF S-HYDROCARBYLTHIOALKYL O,S'-DIALKYL DITHIOPHOSPHATES

In Examples 21–26 which follow, the new dithiophosphate compositions of the present invention were tested in the greenhouse and in the laboratory to determine their biological activity. Structurally related, known compounds, usually leading commercial compounds, were also tested side-by-side to determine the relative pesticidal effectiveness of the new compounds.

In the insecticidal and miticidal tests, the experimental compounds were tested as aqueous emulsions. These emulsions were prepared by dissolving the compound in acetone and dispersing it in distilled water with Triton X-100, an alkylaryl polyether alcohol derived by the reaction of i-octylphenol with ethylene oxide, to give spray emulsions containing the desired concentrations of the compound. These emulsions were then used in standard laboratory tests described below.

Mexican Bean Beetle: Bean leaves were dipped in the emulsion of the test chemical and allowed to dry. Individual treated leaves were placed in petri dishes and four Mexican bean beetle larvae introduced into each of the two replicate dishes.

Southern Army Worm: Bean leaves were dipped in a formulation of the test chemical and allowed to dry. Individual treated leaves were placed in Petri dishes and four Southern Army Worm larvae introduced into each of two replicate dishes.

Mites, Contact: Potted bean plants infested with the two-spotted spider mite were placed on a turntable and sprayed with a formulation of the test chemical. The plants were held for 5 days and the degree of mite control was rated after 2 days.

Mites, Systemic: Bean plants infested with the two-spotted mites were treated by applying 20 ml. of the formulated test chemical to the soil.

Aphid, Contact: Potted nasturtium plants infested with the bean aphids were placed on a turntable and sprayed with a formulation of the test chemical. The plants were held for 2 days and the degree of aphid control was rated.

Aphid, Systemic: Nasturtium plants infested with the bean aphid were treated by applying 20 ml. of the formulated test chemical to the soil. The degree of aphid control was rated after 2 days.

Housefly: Caged houseflies are sprayed with the formulated test chemical. After 2 days the degree of housefly control was rated.

Corn Root Worm: This test was done in the soil with larvae 7–10 days old in the following manner. Seventy-five ml. (90–100 grams) of an air dried soil-sand (2:1) mixture was placed in an 8-ounce plasticized cup. Ten ml. of a 55 ppm. stock equivalent to 5 ppm. in soil or 10 pounds in a 6-inch deep acre, was pipetted onto the surface of the soil. The cup was capped and 1 hour later it was shaken vigorously 30 times. The cap was removed and two very young corn plants and five larvae were introduced. Readings on mortality were made five days later.

Root-knot Nematode: An air-dried 2:1 soil-sand mixture (125 ml.) in an 8-ounce plasticized container was infested with a stock of root-knot nematode prepared 7–10 days previously (at the rate of 6–7 grams of chopped galls per gallon of soil). Ten ml. of the formulated test chemical at 231 ppm. was poured onto the surface of the soil-sand mixture to give a rate equivalent to 25 pounds per 6 inch acre. The container was then capped and shaken vigorously 1 hour later. The container was kept for 5–7 days, then shaken again, and seeded with four cucumber seeds by placing the seeds on the surface and covering with one-half inch of sand. After 3–4 weeks the roots were examined for galls and the degree of control determined.

Cholinesterase Inhibition

To a solution of 0.2 unit of bovine chloinesterase in 2.97 ml. of a buffer solution containing 11.15 grams of disodium hydrogen phosphate dodecahydrate and 1.81 grams of potassium dihydrogen phosphate per liter of water, 0.03 ml. of a solution of the test chemical in acetone was added. This mixture was then incubated in a water bath at 35°C. for 30 min. One ml. of a solution containing 100 milligrams of 5,5'-dithiobis-(2-nitrobenzoic acid), 100 milligrams of acetylthiocholine iodide, and 75 ml. of the above buffer solution in sufficient water to make 200 ml. was then added and the mixture again incubated in a water bath at 35°C. for 30 minutes more. The amount of inhibition of bovine cholinesterase was then determined from the absorbance of this solution at 420 m$\mu$ (milimicron). By using a series of solutions of the test chemical at various concentrations in acetone, the concentration needed for 50% inhibition was determined.

The insecticidal effectiveness of organophosphorus compounds is generally attributed to cholinsterase inhibition. Determination of the cholinesterase inhibition is widely used to estimate the insecticidal potential of new organophosphorus compounds.

FUNGICIDAL TESTS

Bean Powdery Mildew: Eradicant Test

In these tests, the experimental compounds were tested as aqueous emulsions, prepared in the same manner as was previously described above with respect to the insecticidal and miticidal tests.

Bean plants with fully expanded primary leaves were inoculated with spores of the powdery mildew fungus (*Erysiphe polygoni*). Emulsions of the experimental chemicals were then sprayed on the plants placed on a revolving turntable. The plants were then kept in a greenhouse for 7 to 10 days. The amounts of the mildew on their primary leaves were then rated.

Bean Rust: Eradicant Test

Pinto bean plants with fully expanded primary leaves were inoculated with spores of the bean rust fungus (*Uromyces phaseoli*) and incubated for 24 hours. The tests were then carried out as described above for Bean Powdery Mildew.

Bean Rust: Systemic Eradicant Test

Pinto bean plants were inoculated 24 hours prior to use as above and the soil in the pot was then treated with 20 ml. of an emulsion of the test chemical. The rest of the test and the evaluation were then carried out as above for Bean Powdery Mildew.

Sclerotium: Soil Fungicide Test

Sterilized soil was inoculated with Sclerotium and placed into a 4-ounce "Dixie cup," and drenched with 20 ml. of an emulsion of the test chemical. The cup was then incubated for 2 days at 70°F. Thereafter, the amount of mycelial growth on the soil surface was rated and the control by the chemical estimated accordingly.

EXAMPLE 21

The Effect of the Introduction of S-n-Propyl Group into Commercial

O,O'-Diethyl S-Hydrocarbylthioalkyl Dithiophosphate Pesticides

A number of leading commercial O,O'-diethyl

S-hydrocarbylthioalkyl dithiophosphate pesticides were converted to the corresponding O-ethyl S-n-propyl S'-hydrocarbylthioalkyl dithiophosphates using the present process as described in Examples 2-4. The pesticidal activity of the starting commercial compounds was then compared with that of the corresponding O,S-isomers in order to determine the effect of the introduction of the S-n-propyl group. The data resulting are given in Table I below.

as discussed in the Schrader monograph previously mentioned on page 1.

EXAMPLE 22

The Effect of S-Ethyl Versus S-n-Propyl Group on the Pesticidal Activity

The O,S'-dialkyl S-2-alkylthiopropyl dithiophosphates were selected for a study of correlations between chemical structure and biological activity.

TABLE I

Effect of the Introduction of the S-Propyl Group Into Commercial O,O-Diethyl S-hydrocarbylthioalkyl Pesticides $$\begin{array}{c} C_2H_5O \\ n-C_3H_7S \end{array} \!\!\! P(O)-S-(CH_2)_{1-2}-SR_1$$

| Experimental Compound (Example No. or Trade Name) | Southern Army Worm Conc. ppm | Southern Army Worm Mortality, % | Mexican Bean Beetle Larvae Conc. ppm | Mexican Bean Beetle Larvae Mortality, % | House Fly Spray Mortality, % (at 20 ppm) | Corn Rootworm Larvae Mortality, % (at 2.5 ppm) | Nematodes Rate, Control % after 1-4 weeks (at 25 lbs./acre) | Cholinesterase Inhibiting conc. LD50, Mole/Liter |
|---|---|---|---|---|---|---|---|---|
| $C_2H_5O$ \\ $n-C_3H_7S$ $P(O)-SCH_2CH_2SC_2H_5$ | 50 | 100 | 50 | 100 | 100 | 20 | 100 | $1.1 \times 10^{-6}$ |
| (2) $(C_2H_5O)_2P(S)SCH_2CH_2SC_2H_5$ (Disyston) | 50 | 0 | 50 | 30 | 100 | 0 | 0 | $3.8 \times 10^{-4}$ |
| $C_2H_5O$ \\ $n-C_3H_7S$ $P(O)-SCH_2SC_2H_5$ | 100 | 100 | 100 | 100 | 100 | 100 | 100 | $2.7 \times 10^{-6}$ |
| (3) $(C_2H_5O)_2P(S)SCH_2CH_2SC_2H_5$ (Thimet) | 100 | 0 | 100 | 90 | 90 | 100 | 0 | $3.1 \times 10^{-5}$ |
| $C_2H_5O$ \\ $n-C_3H_7S$ $P(O)SCH_2S$—⟨ ⟩—Cl | 100 | 100 | 100 | 100 | 100$^a$ | 0 | 100 | $4.1 \times 10^{-9}$ |
| (4) $(C_2H_5O)_2P(S)SCH_2$—⟨ ⟩—Cl (Trithion) | 100 | 0 | 100 | 90 | 80$^a$ | — | — | $7.9 \times 10^{-4}$ |

$^a$Spray concentration 50 ppm.

The data show that the present process resulted in superior pesticides. The increase of activity on isomerization is believed particularly apparent in the case of the Southern army worm. The increased pesticidal activity, in general, is believed to be apparently related to the increased effectiveness of the isomeric compounds as cholinesterase inhibitors.

An increase of the pesticidal activity is considered to be very surprising since a change from the ethyl to the propyl esters of thio- and dithiophosphorus acids is usually accompanied by a decrease of their effectiveness, In Table II below, the effect of S-ethyl versus the S-n-propyl group is shown on the insecticidal, miticidal and nematocidal activity of the corresponding O-ethyl S-2-ethylthiopropyl dithiophosphate esters. The data show that the S-n-propyl compound is an effective insecticide at 50 ppm while the S-ethyl compound shows no activity at this concentration.

Table III shows the fungicidal activity of the same two compounds. The data show that the S-n-propyl compound is again active at concentrations where the S-ethyl compound shows no sign of activity.

TABLE II

The Effect of the S-Ethyl versus the S-n-Propyl Group on the Pesticidal Activity of O-Ethyl S-2-Ethylthio-Propyl Dithiophosphate Esters $$\begin{array}{c} C_2H_5O \\ R''S \end{array} \!\!\! P(O)-S-CH_2-CH(CH_3)-SCH_2CH_3$$

| Experimental Compound | | Conc. ppm | S. Army Worm | Mex. Bean Beetle | Spider Mites Contact | Spider Mites Systemic | Bean Aphids Contact | Bean Aphids Systemic | Corn Rootworm (0.25 ppm) | Nematode Control (25lb/acre) |
|---|---|---|---|---|---|---|---|---|---|---|
| Ex. No. | R'' | | | | | | | | | |
| 1 | $C_2H_5$ | 250 | 0 | 50 | 90 | 50 | 80 | 0 | 20 | 20 |
|  |  | 50 | 0 | 0 | 0 | 0 | 0 | 0 | — | — |
| 7 | $n-C_3H_7$ | 250 | 100 | 100 | 100 | 100 | 100 | 100 | 100 | 100 |
|  |  | 50 | 100 | 100 | 100 | 100 | 100 | 0 | — | — |

TABLE III

The Effect of the S-Ethyl versus the S-n-Propyl Group on
the Fungicidal Activity of O-Ethyl S-2-Ethylthiopropyl
Dithiophosphate Esters

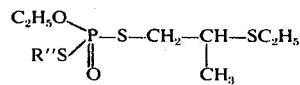

| Experimental Compound | | Control of Foliar Fungi (After Days), % (at 200 ppm) | | | Control of Sclerotium,% (at 100 lb/acre) |
|---|---|---|---|---|---|
| Example No. | R | Bean Mildew Eradicant | Bean Rust Eradicant | Bean Rust Systemic Eradicant | |
| 1 | $C_2H_5$ | 0 | 0 | 0 | 0 |
| 7 | $n-C_3H_7$ | 70 | 80 | 90 | 60 |

EXAMPLE 23

The Effect of the Structure of the Higher S-Alkyl Groups on the Pesticidal Activity

After finding that the substitution of the O-ethyl by the S-n-propyl group increases pesticidal activity, the effect of other higher S-alkyl groups was examined. The results are shown in Table IV.

The results show that all the $C_3$–$C_4$ S-alkyl compounds have superior pesticidal activity to the known $C_1$–$C_2$ S-alkyl compounds. The activity of the S-n-propyl compound was found to be the best, followed, in decreasing order of activity, by the S-primary isobutyl, the S-i-propyl and the S-n-butyl compounds.

EXAMPLE 24

Effect of the Structure of the O-Alkyl Groups on the Pesticidal Activity

The effect of the O-alkyl groups was studied on the S-n-propyl S-methylthiopropyl dithiophosphate esters. The data are shown in Table V below. They indicate that the presence of the O-ethyl group leads to the best overall activity. Although the systemic effectiveness of the O-methyl derivative is better because of its higher polarity, its general contact activity is lower. The O-n-propyl derivative shows the least activity both as a contact and as a systemic pesticide.

TABLE IV

The Effect of the Structure of the Higher S-Alkyl Groups on the
Activity of O-Ethyl S-Alkyl S'-2-Methylthiopropyl Dithio-
Phosphate Pesticides

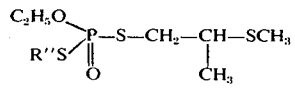

| Experimental Compound | | | | | Mortality Produced, % | | | | |
|---|---|---|---|---|---|---|---|---|---|
| Example No. | R'' | Conc. ppm | S. Army Worm | Mex. Bean Beetle | Spider Mites Contact | Spider Mites Systemic | Bean Aphids Contact | Bean Aphids Systemic | House Flies |
| 6 | $CH_3CH_2CH_2$ | 250 | 100 | 100 | 100 | 100 | 100 | 100 | 100 |
|   |   | 50 | 100 | 100 | 100 | 100 | 100 | 0 | 100 |
| 16 | $(CH_3)_2CH$ | 250 | 100 | 100 | 100 | 100 | 100 | 80 | 100 |
|   |   | 50 | 100 | 0 | 100 | 0 | 50 | 20 | 0 |
| 15 | $CH_3CH_2CH_2CH_2$ | 250 | 100 | 0 | 100 | 100 | 100 | 40 | 100 |
|   |   | 50 | 80 | 0 | 100 | 0 | 60 | 0 | 0 |
| 11 | $(CH_3)_2CHCH_2$ | 250 | 100 | 80 | 100 | 100 | 100 | 100 | 100 |
|   |   | 50 | 100 | 0 | 60 | 100 | 10 | 70 | 45 |

TABLE V

The Effect of the Structure of O-Alkyl Groups on the Pesticidal Activity
of O-Alkyl S-n-Propyl S-2-Methylthiopropyl Dithiophosphates

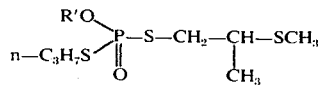

| Experimental Compound | | | | | Mortality Produced, % | | | | |
|---|---|---|---|---|---|---|---|---|---|
| Example No. | R' | Conc. ppm | S. Army Worm | Mex. Bean Beetle | Spider Mites Contact | Spider Mites Systemic | Bean Beetle Contact | Bean Beetle Systemic | House Flies |
|   | $CH_3$ | 250 | 100 | 100 | 100 | 100 | 100 | 100 | 100 |
|   |   | 50 | 0 | 0 | 100 | 100 | 100 | 100 | 100 |
| 6 | $CH_3CH_2$ | 250 | 100 | 100 | 100 | 100 | 100 | 100 | 100 |
|   |   | 50 | 100 | 100 | 100 | 100 | 100 | 0 | 100 |
| 17 | $CH_3CH_2CH_2$ | 250 | 0 | 100 | 100 | 100 | 80 | 20 | 100 |
|   |   | 50 | 0 | 80 | 50 | 0 | 80 | 0 | 70 |

EXAMPLE 25

Effect of the Structure of the S-Alkyl Group of the Thioether Moiety on the Pesticidal Activity The effect of the structure of the S-alkyl thioether group was examined on the S-2-alkylthiopropyl esters of O-ethyl S'-n-propyl dithiophosphoric acid esters having optimized O,S-dialkyl groups.

The data included in Table VI below show that the S-methyl, -ethyl and n-propyl derivatives all have about the same pesticidal activity. Higher S-alkyl derivatives such as the S-n-hexyl compound, however, show a decreased level of activity. Overall, the activity is less sensitive to the alkyl variation in the thioether than in the phosphorus ester groups of the molecule.

The oxidation of the thioether group to the corresponding sulfoxide and sulfone group has also relatively little effect on the activity.

EXAMPLE 26

Effect of the Structure of the Alkylene Group on the Pesticidal Activity

Known, commercial S-hydrocarbylthioalkyl O,O'-dialkyl dithiophosphates have a methylene or an ethylene group for the alkylene part of the molecule. In Example 21 it has previously been shown that the O-ethyl S'-n-propyl dithiophosphate ester derivatives of these products are superior, novel pesticides. The effect of higher alkylene groups was also studied, using the present, novel O-lower alkyl S'-higher alkyl dithiophosphate esters. As an optimized structure type, O-ethyl S-n-propyl S'-methylthioalkyl dithiophosphate was selected for $C_3$ to $C_6$ alkylene variation. The results are shown in Table VII below.

The data indicate that the $C_3$ and $C_4$ alkylene groups lead to highly active compounds. The optimal alkylene group was found to have three carbon atoms. Alkylene groups having more the four carbon atoms show a definite drop in activity. For example, the t-butyl ethylene compound shows very little insecticidal activity at 50 ppm.

EXAMPLE 27

The Effect of the S-n-Propyl Group on the Toxicity Towards Warm Blooded Animals The pesticidally effective novel O-ethyl S-n-propyl S'-alkylthioalkyl compounds were also examined for their acute, oral toxicity on rats. Conventional toxicity experiments were designed to determine the effect on toxicity of the S-n-propyl group which is the key group in attributing the pesticidal activity. The data are shown in Table VIII below.

Studying the first three compounds, i.e., S-ethylthioethyl O-ethyl dithiophosphate derivatives, it was found

TABLE VI

Effect of the Structure of the S-Alkylthioether Group on the Pesticidal Activity O-Ethyl S-n-Propyl S-2-Alkylthiopropyl Dithiophosphates

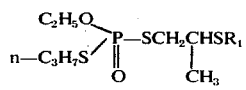

| Experimental Compound Example No. | $R_1$ | S.Armyworm Mortality; % (at 250 ppm) | Mexican Bean Beetles Mortality, % (at 50 ppm) | Spider Mites Mortality, % (at 10 ppm) | Bean Aphids Mortality, % (at 50 ppm) | Corn Rootworm Mortality, % (at 2.5 ppm) | Nematode Control, % (at 25 lb/acre) |
|---|---|---|---|---|---|---|---|
| 6 | $CH_2$ | 100 | 100 | 100 | 100 | 100 | 100 |
| 7 | $C_2H_5$ | 100 | 70 | 100 | 100 | 100 | 100 |
| 8 | n—$C_3H_7$ | 100 | 100 | 100 | 100 | 100 | 100 |
| 9 | i—$C_3H_7$ | 100 | 100 | 100 | 50 | 70 | 100 |
| 10 | n—$C_6H_{13}$ | 100 | 100 | 90 | 50 | 0 | 10 |

TABLE VII

Effect of the Structure of the Alkylene Group on the Pesticidal Activity of O-Ethyl S-n-Propyl S'-2-Methylthioalkyl Dithiophosphates

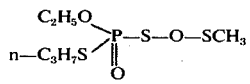

| Experimental Compound Example No. | Q | S.Armyworm | Mortality Produced at 50 ppm, % Mexican Bean Beetles | Spider Mites | Bean Aphids | Houseflies | Corn Rootworm Mortality, % at 2.5 ppm | Nematodes Control % at 25 lb/acre |
|---|---|---|---|---|---|---|---|---|
| 20 | $CH_2CH_2CH_2$ | 100 | 100 | 100 | 100 | 100 | 0 | 90 |
| 6 | $CH_2CH(CH_3)$ | 100 | 100 | 100 | 100 | 100 | 100 | 100 |
| 12 | $CH_2CH(CH_2CH_3)$ | 80 | 10 | 100 | 100 | 100 | 40 | 90 |
| 13 | $CH_2CH[C(CH_3)_3]$ | 0 | 0 | 100 | 30 | 20 | 80 | — | that both the O,S-isomerization and replacement of an O-ethyl with an S-n-propyl group result in reduced toxicity. Using the present process, the new S-propyl compound with a median lethal dose, $L_{D50}$, of 318 mg/kg is produced from Disyston having a median lethal toxicity, $L_{D50}$, of 25 mg/kg.

The present process similarly yields S-n-propyl derivatives of reduced toxicity in the case of S-2-alkylthiopropyl O-ethyl dithiophosphate derivatives as shown by the compounds of Examples 6–8. The S-2-n-propylthiopropyl compound of Example 8 has a particularly low toxicity.

It is most surprising and advantageous that within the present new class of compounds the highly effective pesticides have low toxicities.

S-hydrocarbylthioalkyl dithiophosphate compositions can be prepared by a combination of selective dealkylation and alkylation reactions. While the novel compositions are generally useful as animal and plant pesticides, it has been found that certain compositions are more attractive for economical use, lesser amounts of these compounds being sufficient for pest control. More specifically, O-ethyl S-n-propyl S'-hydrocarbylthioalkyl dithiophosphates represent a pesticidally very highly active but relatively nontoxic, novel class of pesticides. These pesticides are particularly attractive for the control of insects, mites, nematodes, foliar and soil fungi. Due to their high insecticidal effectiveness and low toxicity, they have a potentially high therapeutic index for application in animal health control.

TABLE VIII

The Effect of the S-n-Propyl Group on the Toxicity Towards Warm blooded Animals

Experimental Compound

| Example No. (Reference) | Structure | Acute Oral Toxicity on Rats, Median Lethal Conc., $LD_{50}$ mg/kg |
|---|---|---|
| (Disyston[a]) | $C_2H_5O$–P(=S)–$SCH_2CH_2SC_2H_5$ ; $C_2H_5O$ | 25 |
| (a) | $C_2H_5O$–P(=O)–$SCH_2CH_2SC_2H_5$ ; $C_2H_5S$ | 100 |
| 2 | $C_2H_5O$–P(=O)–$SCH_2CH_2SC_2H_5$ ; $n$-$C_3H_7S$ | 318 |
| (b) | $C_2H_5O$–P(=S)–$SCH_2CHSCH_3$ ; $C_2H_5O$ ; $CH_3$ | 25–50 |
| 6 | $C_2H_5O$–P(=O)–$SCH_2CHSCH_3$ ; $n$-$C_3H_7S$ ; $CH_3$ | 109 |
| (b) | $C_2H_5O$–P(=S)–$SCH_2CHSC_2H_5$ ; $C_2H_5O$ ; $CH_3$ | 25–50 |
| 7 | $C_2H_5O$–P(=O)–$SCH_2CHSC_2H_5$ ; $n$-$C_3H_7S$ ; $CH_3$ | 214 |
| 8 | $C_2H_5O$–P(=O)–$SCH_2CHSC_3H_7$-$n$ ; $n$-$C_3H_7S$ ; $CH_3$ | 422 |

(a) – Described in German patent 1,032,247
(b) – Synthesis described in French patent 1,509,248

In conclusion, it has been found in the present invention that novel, useful O-alkyl S'-higher alkyl It is to be understood that the invention is not limited to the various embodiments and specific examples shown above since these have been offered merely as illustrations. Other O,S-dialkyl S′-hydrocarbylthioalkyl dithiophosphates can be prepared and used and other modifications can be made thereof without departing from the spirit and purview of this invention.

What is claimed is:

1. A compound of the formula

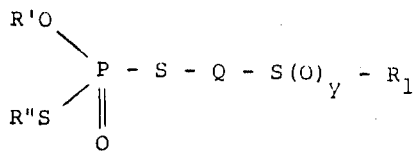

wherein R′ is $C_1$ to $C_{16}$ alkyl; R″ is $C_3$ to $C_{16}$ alkyl; $R_1$ is phenyl or phenyl substituted by halogen, methylthio, methylsulfonyl or nitro; Q is $C_1$ to $C_6$ alkylene; and Y is 0 to 2.

2. Compositions of the general formula:

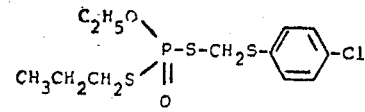

wherein $m$ is 1 or 2; $n$ is 3 or 4; $k$ is from 1 to 4; and X is a member selected from the group consisting of hydrogen, halogen, methylthio and methylsulfonyl.

3. A compound according to claim 2 wherein $k$ is 1.

4. A compound according to claim 2 wherein the group $C_nH_{2n+1}$ is n-propyl.

5. A composition of the formula:

$$\begin{array}{c} C_2H_5O \\ \phantom{CH_3CH_2CH_2S}\diagdown \\ \phantom{CH_3CH_2CH_2S}P-S-CH_2S-\!\!\langle\ \rangle\!-Cl \\ CH_3CH_2CH_2S\diagup\|\phantom{-S-CH_2S-\langle\ \rangle-Cl} \\ \phantom{CH_3CH_2CH_2S\diagup}O\phantom{-S-CH_2S-\langle\ \rangle-Cl} \end{array}$$

* * * * *